No. 728,144. PATENTED MAY 12, 1903.
T. TRIBE.
SCREW ANCHOR.
APPLICATION FILED AUG. 2, 1902.

NO MODEL.

Inventor
Thomas Tribe.

Witnesses
Harry L. Ames.
Chas. S. Hoyer.

By Victor J. Evans
Attorney

No. 728,144. Patented May 12, 1903.

UNITED STATES PATENT OFFICE.

THOMAS TRIBE, OF COLORADO SPRINGS, COLORADO.

SCREW-ANCHOR.

SPECIFICATION forming part of Letters Patent No. 728,144, dated May 12, 1903.

Application filed August 2, 1902. Serial No. 118,172. (No model.)

*To all whom it may concern:*

Be it known that I, THOMAS TRIBE, a citizen of the United States, residing at Colorado Springs, in the county of El Paso and State of Colorado, have invented certain new and useful Improvements in Screw-Anchors, of which the following is a specification.

This invention relates to screw-anchors or means for retaining a screw in positive position within a soft material.

Difficulty is frequently encountered in firmly holding a screw in soft wood or the like in view of the lack of firmness of the fiber or grain of the wood or other soft material. Many attempts have been made to practically hold a screw in stone or metal structures by the introduction in sockets, suitably formed to receive them, of fillings of soft metal, which presumably adhere to the stone or metal with sufficient firmness to establish a tight joint between two contiguous parts, through which are passed screws and having their threads embedded in the said sockets. Wooden plugs have also at times been inserted in soft wood to receive screws; but all of such devices have been first inserted in the stone, metal, or soft wood, or other material and the screw afterward turned thereinto.

The purpose of the present improvement is to overcome the numerous disadvantages heretofore experienced in securing a screw, particularly in soft wood, and to avoid any preliminary preparation of the wood to receive screws; and to accomplish this end the present invention consists of a thin sheet-metal anchor of suitable form, which is applied over the threads of a screw and with the latter simultaneously penetrated in soft wood or other material and owing to its pliability partakes of the thread formation of the screw and serves to prevent the screw-threads from loosening by avoiding contact thereof directly with the wood.

Another advantage of the present improvement is that after the anchor has been inserted in the wood or other soft material with the screw it remains in its applied position in the form of a socket, from which the screw can be withdrawn and afterward reset without contacting with the wood, and thereby serve to firmly secure the screw in the wood and preserve a reliable means for preventing the screw from loosening.

Figure 1:
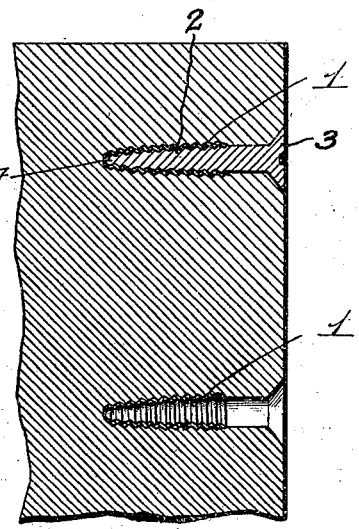
Figure 2:
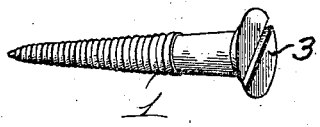
Figure 3:
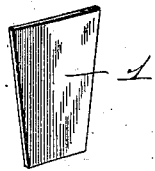

In the drawings, Figure 1 is a sectional view of a piece of wood or other soft material, showing a screw having the improved anchor thereon embedded in such wood or material and also illustrating the anchor in place in the latter after the screw has been withdrawn and ready to again receive the screw. Fig. 2 is a detail perspective view of a screw, showing the improved pliable anchor applied thereto and ready for insertion with the screw into the soft wood or other analogous material. Fig. 3 is a detail perspective view of the anchor.

Similar numerals of reference are employed to indicate corresponding parts in the several views.

The improved anchor 1 is bent around the threads 2 of a screw 3, and said anchor is primarily of the form shown by Fig. 3 and has a keystone shape to compensate for the conical or tapered contour of the threaded portion of the screw. The anchor 1 is formed of suitable pliable sheet metal and when applied it is pressed closely in contact with the threads and is bent over the point 4. By pressing the anchor 1 in firm engagement with the threads of the screw the latter provide the anchor with slight corrugations corresponding to said threads and of a sufficiently tangible nature as to assist in inserting the screw into soft wood or other soft material. The anchor is of such length as to fully cover the threads 2, and hence the sharp edges of the latter do not engage the fiber of the wood or other material, and therefore cutting of such fiber is prevented; but when the screw bearing the anchor is inserted in the wood the corrugations formed in the anchor by the close application thereof to the threads become firmly pressed into the wood and the anchor is thus held against movement in an outward direction when the screw is withdrawn therefrom and from the wood. It will be observed that a metallic partition is interposed, through the use of the anchor, between the threads of the screw and the wood or other material, and the formation in the anchor of the corrugations corresponding to the threads of the screw provides a metallic socket for the latter, which is inserted in the wood or other material simultaneously with the introduction into the latter of the screw.

The improved anchor is inexpensive and can be readily applied without requiring exceptional skill, and in view of the advantages arising from the application of the anchor to a screw the increased cost, in view of the addition, is immaterial. It is also obvious that the blanks for the anchors may be varied in the proportions and dimensions proportionately to different sizes of screws without in the least affecting the principle of the invention.

Having thus fully described the invention, what is claimed as new is—

1. The combination with a screw, of a sheet-metal anchor bent around and corrugated by the threads thereof.

2. An anchor for a screw consisting of a piece of sheet metal reduced in width toward one end.

3. The combination with a screw, of a thread-anchor therefor consisting of a piece of sheet metal closely bent therearound and over the point thereof and insertible simultaneously with the screw.

In testimony whereof I affix my signature in presence of two witnesses.

THOMAS TRIBE.

Witnesses:
EDGAR T. ENSIGN,
WILLIS R. ARMSTRONG.